UNITED STATES PATENT OFFICE.

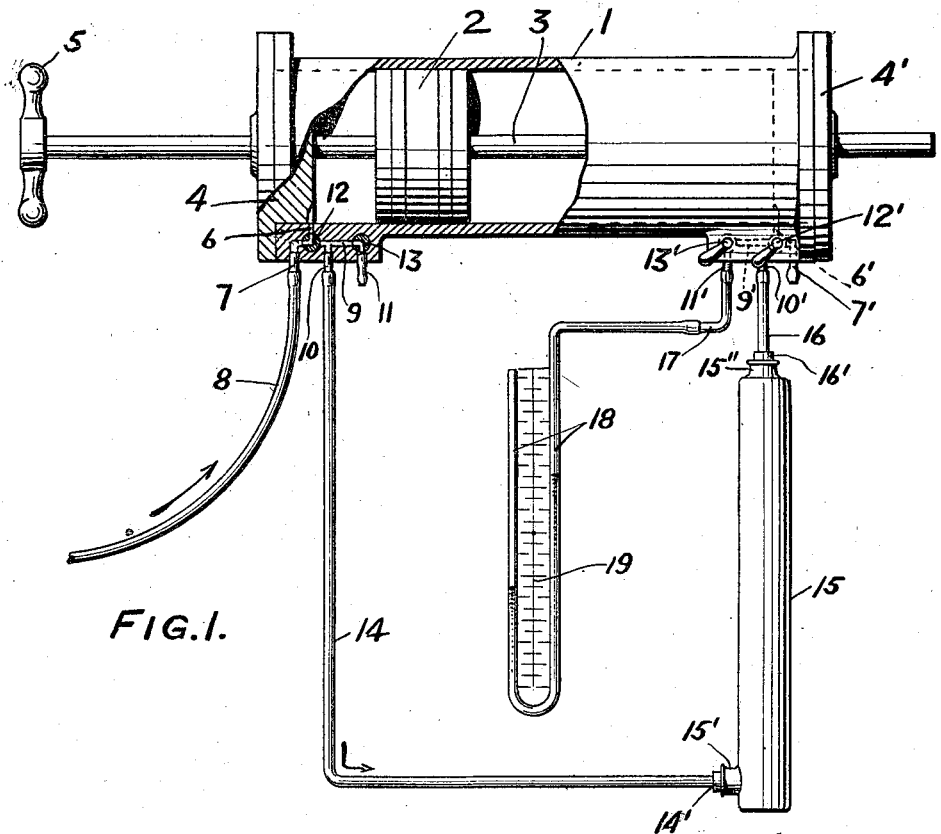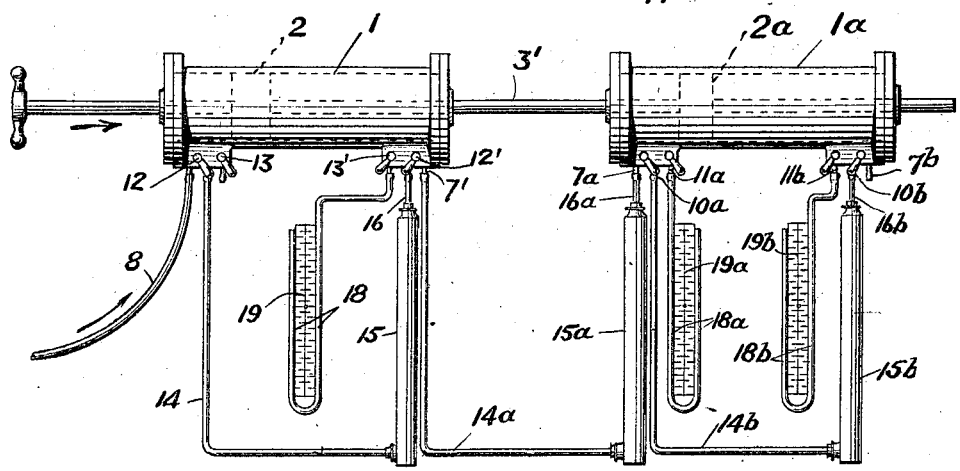

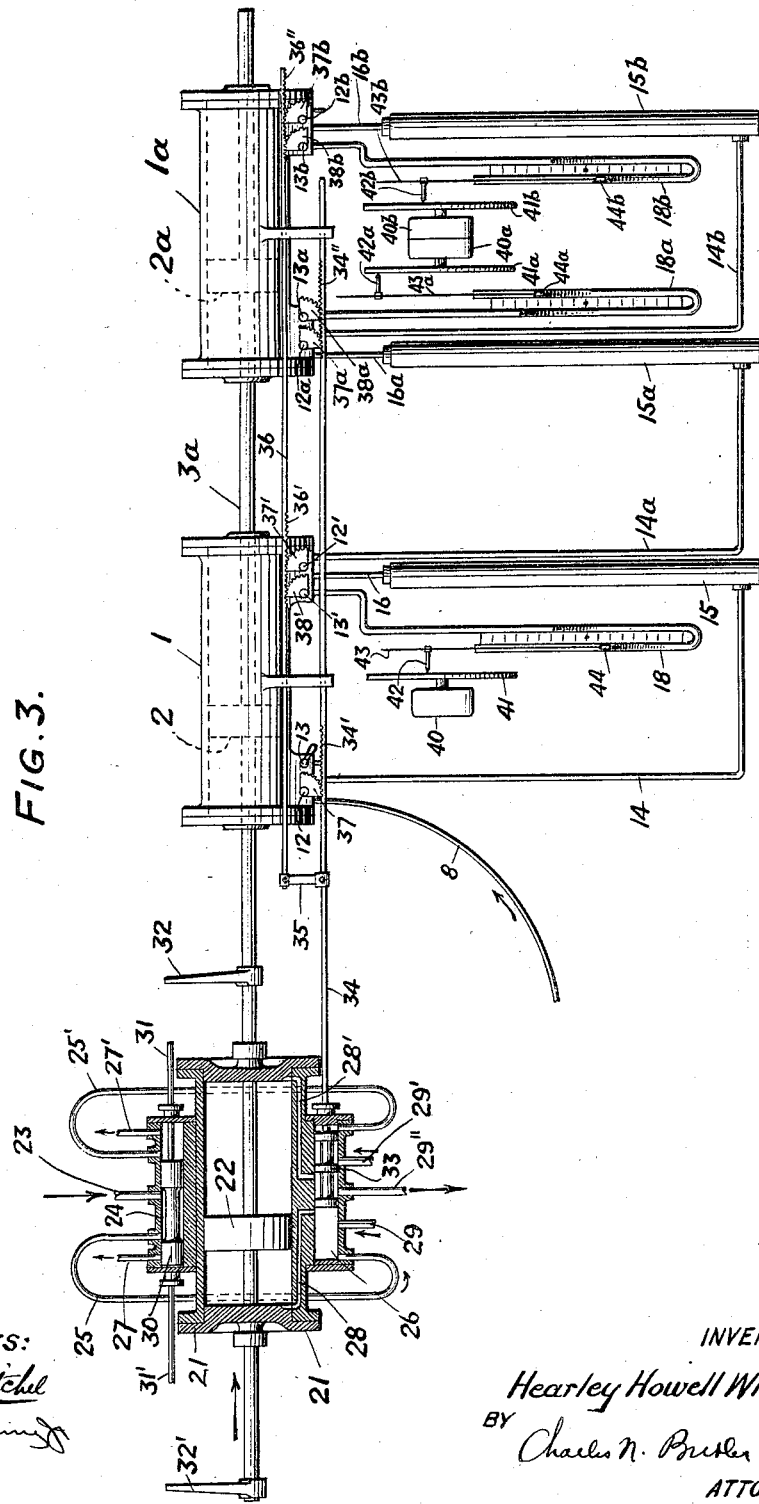

HEARLEY HOWELL WILSON, OF ALTOONA, PENNSYLVANIA.

MEANS FOR ANALYZING FLUE-GASES.

1,023,188.  Specification of Letters Patent.  Patented Apr. 16, 1912.

Application filed May 12, 1911. Serial No. 626,680.

*To all whom it may concern:*

Be it known that I, HEARLEY HOWELL WILSON, a citizen of the United States, residing at Altoona, in the county of Blair and State of Pennsylvania, have invented certain Improved Means for Analyzing Flue-Gases, of which the following is a specification.

My invention relates to means for analyzing gases by passing them through a solution or solutions capable of absorbing a constituent or constituents thereof, and my leading purpose is to provide simple means by which uniform volumes of gas can be drawn, deprived of one or more constituents and the results shown by a determination of the pressure of the remaining gas expanded to the original volume.

Further purposes of my invention are to automatically operate the mechanism continuously, obtain analyses of successive samples at regular intervals, determine the amounts of several constituents, and record the amounts so determined.

The characteristic features of my invention are fully set forth in the following description and the accompanying drawings in illustration thereof.

In the drawings, Figure 1 is a part sectional side elevation of apparatus embodying my invention in form adapted for effecting a single expansion of gas that has been deprived of a constituent, together with an indication of the quantity of the deleted constituent; Fig. 2 is a side elevation of apparatus embodying my invention in form adapted for effecting successive expansions of the remainder of a gas that has been deprived of several constituents in succession, together with an indication of the quantities of the several deleted constituents, and Fig. 3 is a part sectional side elevation of apparatus embodying my invention in form adapted for continuous automatic operation and recording the amounts of several constituents.

The apparatus, as illustrated in Fig. 1, comprises a cylinder 1 containing a piston 2 fixed on a rod 3 which is adapted to reciprocate through the cylinder heads 4 and 4', the rod being operated by the handle 5 thereon. The cylinder is provided with the passages 6 and 6' which are adapted for connecting the interior thereof adjacent to the respective cylinder heads with the respective nipples 7 and 7', the former being connected with the tube 8 by which the gas to be tested is introduced to one end of the cylinder and the latter being adapted for connecting the other end of the cylinder with the atmosphere to which the expanded gas is discharged. Passages 9 and 9' are adapted for connecting the respective passages 6 and 6' with the nipples 10 and 10', and 11 and 11'. Valves 12 and 12' are adapted for connecting the corresponding ends of the cylinder with the respective nipples 7 and 7' or the respective passages 9 and 9', and valves 13 and 13' control the communication from the respective passages 9 and 9' to the corresponding nipples 11 and 11'. The nipple 10 is connected by a tube 14 with the bottom of a tube 15 which has its top connected with the nipple 10' by the tube 16, the tube 15 being suitably of glass with an open branch 15' adapted for receiving the cork 14' on the tube 14 and the open branch 15'' adapted for receiving the cork 16' on the tube 16. The nipple 11' is connected by a tube section 17 with a manometer or glass U-tube 18, which is provided with a scale 19.

In operation, for determining the carbon dioxid in flue gas, the tube 15 is provided with a solution of caustic soda capable of absorbing the carbon dioxid and steel turnings for breaking up the bubbles and facilitating the reaction. The cylinder 1 is initially connected with the atmosphere through the nipples 11 and 7' by properly operating the valves 12, 12', and 13, and the piston 2 is drawn into contact with the head 4. The valve 12 is then turned to establish communication from the tube 8 through the nipple 7 and passage 6 with the left end of the cylinder, whose right end remains connected with the atmosphere. The piston is then pushed through the cylinder until it comes into contact with the head 4', whereby flue gas is drawn into the left end of the cylinder as the air is discharged from its right end. The valves 12 and 12' are then turned to establish communication between the left end of the cylinder and the tube 14 and between the right end of the cylinder and the tube 16, the valve 12' closing the passage through the nipple 7', and the valve 13 is operated to close the passage through the nipple 11. The piston is now moved to the left end of the cylinder and the gas is discharged therefrom by way of the now connected passages 6 and 9, through the passage formed by the parts 10, 14, 15, and 16 to the now connected passages 9′ and 6′, whence it is delivered to the right end of the cylinder, the carbon dioxid being separated from the gas by the passage of the latter through the caustic soda in the tube 15. When the piston has been brought into contact with the head 4, all the gas will have been delivered into the right end of the cylinder where it occupies the volume originally occupied when drawn into the left end of the cylinder, prior to the absorption of the carbon dioxid constituent. The expansion of the gas deprived of its carbon dioxid to the original volume being accompanied by a reduction in pressure, such reduced pressure is determined by establishing communication between the cylinder and the mercury manometer tube 18 through the connected passages 6′ and 9′, the nipple 11′ and the tube 17, whereby the amount of carbon dioxid is determined. Then by properly operating the valves 12 and 12′, upon the reverse movement of the piston the gas in the cylinder is discharged through the passage 6′ and nipple 7′, while a new charge is drawn into the opposite end of the cylinder. It will be understood that the valve 13 is normally closed, being used to discharge to the atmosphere a sample of gas which it is desired to discard, and the valve 13′ is kept closed during the entire cycle of operation, excepting when it is desired to determine the pressure of the gas in the cylinder after the piston has been brought into contact with the head 4.

In the form of the apparatus shown in Fig. 2, there are two alined cylinders 1 and $1^a$ (of like size and character) containing the respective pistons 2 and $2^a$ fixed on the piston rod 3′ which is adapted to reciprocate in the heads of the cylinders. The nipple 7′ of the cylinder 1 is connected by a tube $14^a$ with the bottom of a tube $15^a$ which has its top connected by the tube $16^a$ with the nipple $7^a$ of the cylinder $1^a$. A tube $14^b$ connects the nipple $10^a$ of the cylinder $1^a$ with the bottom of a tube $15^b$ which is connected by the tube $16^b$ with the nipple $10^b$. The nipple $11^a$ is connected with the manometer $18^a$ having the scale $19^a$ and the nipple $11^b$ is connected with the manometer $18^b$ having the scale $19^b$. This construction is adapted for determining the amount of carbon dioxid, oxygen and carbon monoxid in flue gas by providing the tube 15 with a solution of caustic soda of sufficient strength to absorb the carbon dioxid from the gas passed therethrough, providing the tube $15^a$ with a solution of pyrogallic acid capable of absorbing the oxygen of the gas, and providing the tube $15^b$ with a solution of cuprous chlorid capable of absorbing the carbon monoxid.

With the valves 12, 12′, 13 and 13′ properly set, as previously described, a full charge of flue gas is drawn through the tube 8 into the cylinder 1, by operating the piston in the direction of the arrow, and then forced through the tubes 14, 15 and 16 back into the opposite end of the cylinder by moving the piston in the opposite direction. The carbon dioxid is absorbed by its passage through the caustic soda in the tube 15 and the amount of such carbon dioxid is indicated by the communication of the pressure of the expanded gas to the manometer 18 having the scale 19. The valves are now set so that, upon again moving the pistons in the direction of the arrow, a second charge of gas is drawn through the tube 8 into the left end of the cylinder 1 and the gas that has been deprived of its carbon dioxid is forced from the right end of the cylinder through the tubes $14^a$, $15^a$, and $16^a$ into the cylinder $1^a$, being deprived of its oxygen by its passage through the pyrogallic acid in the tube $15^a$. The amount of such oxygen is determined by taking the difference between the indications of the scale 19 of the manometer 18 and that of the scale $19^a$ of the manometer $18^a$, the latter showing the pressure of the gas deprived of both carbon dioxid and oxygen. With the valves properly set, upon drawing back the pistons, the gas expanded in the left end of the cylinder $1^a$ is forced through the tubes $14^b$, $15^b$ and $16^b$ into the opposite end of this cylinder, the cuprous chlorid in the tube $15^b$ absorbing the carbon monoxid. The amount of such monoxid is determined by taking the difference between the indications of the manometer scales $19^a$ and $19^b$, the latter indicating the pressure of the gas deprived of its carbon dioxid, oxygen and carbon monoxid, which gas is discharged to the atmosphere through the nipple $7^b$ upon the reverse movement of the pistons.

The form of the invention illustrated in Fig. 3 is a development of that shown in Fig. 2 with the addition of mechanism for effecting an automatic operation and recording the results. In this construction, the cylinders 1 and $1^a$ have their pistons 2 and $2^a$ fixed on a rod $3^a$ which passes through a motor cylinder 21 having therein a piston 22 fixed on the rod. A motive fluid is delivered by the pipe 23 to the valve chamber 24 which is connected by the ducts 25 and 25′ with opposite ends of the valve chamber 26 and has the discharge ducts 27 and 27′ at the ends thereof. The chamber 26 is connected with the opposite ends of the cylinder 21 by the ducts 28 and 28′ and has connected therewith the supply passages 29 and 29′ and the discharge passage 29″. The chamber 24 contains a piston valve 30 which controls the communications of the ducts connected with the chamber, the valve having the rods 31 and 31′ which project through the heads of the cylinder so as to be engaged by the arms 32 and 32′ on the rod $3^a$, whereby this valve is shifted. The chamber or cylinder 26 contains the piston valve 33 which controls the communication of the ducts 28, 28', 29, 29' and 29", this valve being operated by pressure communicated through the ducts 25 and 25'. The valve 33 is connected with a rod 34 having thereon the toothed sections 34' and 34", this rod 34 being connected by an arm 35 with a rod 36 having the toothed sections 36' and 36". The valve 12 is provided with a toothed segment 37 which engages the rack 34'; the valves $12^a$ and $13^a$ are provided with the respective toothed segments $37^a$ and $38^a$ which engage the toothed rack 34"; the valves 12' and 13' are provided with the toothed segments 37' and 38' which engage the rack section 36'; and the valves $12^b$ and $13^b$ are provided with the toothed segments $37^b$ and $38^b$ which engage the toothed section 36".

A clock 40 revolves a disk 41 at a constant rate and a marker 42 is movable between the center and the periphery of the disk by means of a rod 43 which is fixed on a float 44 supported by the mercury in the manometer 18. A clock $40^a$ revolves a disk $41^a$ at a constant rate and a marker $42^a$ is movable between the center and periphery of this disk by a rod $43^a$ which is fixed on a float $44^a$ supported by the mercury in the manometer $18^a$. A clock $40^b$ revolves a disk $41^b$ at a constant rate and a marker $42^b$ is movable between the center and periphery of this disk by a rod $43^b$ which is fixed to a float $44^b$ supported by the mercury in the manometer $18^b$.

In operation, with the apparatus in the position illustrated, motive fluid is delivered by the duct 23 through the cylinder 24 to the duct 25, which delivers it through the cylinder 26 and duct 28 to the cylinder 21, the piston 22 therein being moved in the direction of the arrow and the cylinder exhausting ahead of the piston through the now connected ducts 28' and 29". A charge of gas is drawn through the tube 8 into the cylinder 1 by this operation and when the pistons 2 and $2^a$ approach the limit of their movement in this direction, the arm 32' strikes the rod 31' to shift the valve 30 so as to establish communication between the ducts 23 and 25', the movement of the piston 22 being continued by fluid pressure from the passage 29 after the passage 25 has been cut out by the valve 30. The valve 30 having established communication between the passages 23 and 25', the pressure communicated through the passage 25' shifts the valve 33, whereby communication is established from the ducts 25' and 29' to the duct 28', and from the duct 28 to the duct 29", to effect the reverse movement of the piston 22, while the rods 34 and 36 are moved so as to turn the segments 37, $37^a$ $38^a$, 37', 38', $37^b$, and $38^b$, whereby the corresponding valves are shifted.

The piston 22 is now driven reversely to the direction of the arrow and the piston 2 drives the charge of gas in the cylinder 1 through the tubes 14, 15, and 16 to the opposite end of the cylinder where it expands and, its pressure being communicated to the manometer 18, the amount of carbon dioxid eliminated therefrom by the caustic soda is indicated on the disk 41 by the marker 42. As the piston 22 approaches the limit of its movement, the arm 32 strikes the rod 31 and the valve 30 is shifted to its original position, establishing the communications previously described and moving the valve 33 to its original position, whereby the valves 12, 12', 13', $12^a$, $13^a$, $12^b$, $13^b$ are shifted as the pistons 2 and $2^a$ reach the limit of their movement. The operation is now repeated and the gas in the cylinder 1, which has been deprived of its carbon dioxid, is driven through the tubes $14^a$, $15^a$, and $16^a$ into the cylinder $1^a$, it having been deprived of its oxygen by passing through the pyrogallic acid in the tubes $14^a$ and $15^a$ and the amount of oxygen thus absorbed being proportional to the difference between the indications of the markers 42 and $42^a$. Upon the next reversal of the mechanism, the gas in the cylinder $1^a$ is forced through the tubes $14^b$, $15^b$ and $16^b$ into the opposite end of the cylinder, it being deprived of its carbon monoxid by the cuprous chlorid in the tubes $14^b$, $15^b$ and the amount of the carbon monoxid being indicated by the difference of the positions of the markers $42^a$ and $42^b$. It will be understood that by operating the motor mechanism and the clocks constantly a record will be made upon the respective disks which will represent graphically the constituents of the gases throughout any definite period.

Having described my invention, I claim:

1. The combination of a container for a substance adapted for absorbing a constituent of a gas, with means for drawing a predetermined quantity of gas and forcing it into said container, means for receiving gas delivered from said container and permitting it to expand to a predetermined volume, and a gage operated by the pressure of said expanded gas.

2. The combination of a cylinder, a piston therein, a passage connecting the ends of said cylinder, means in said passage for absorbing a constituent of a gas, and a passage connected with one end of said cylinder for delivering gas thereto.

3. The combination of a cylinder, a piston therein, a passage connecting the ends of said cylinder, means in said passage for absorbing a constituent of a gas, a passage connected with one end of said cylinder for the introduction of said gas thereto, and means connected with the other end of said cylinder and operated by the pressure of the gas therein whereby the quantity of the constituent absorbed is determined.

4. The combination of a cylinder, a piston therein, a passage exhausted by said piston into one end of said cylinder, a valve for closing said passage, a pressure gage and a discharge passage connected with the other end of said cylinder, and a passage connecting the ends of said cylinder.

5. The combination of a cylinder, a piston therein, means for reciprocating said piston, means comprising a column of liquid through which gas can be forced by said piston from one end to the other end of said cylinder, a valved passage through which gas can be drawn by said piston into one end of said cylinder, and means comprising a tube containing a column of mercury connected with the other end of said cylinder and a valved passage by which gas can be discharged from the last named end of said cylinder.

6. The combination of a plurality of cylinders, passages connecting the ends of the respective cylinders, a passage whereby one of said cylinders can be discharged into the other, a solution in each of said passages adapted for absorbing constituents of a gas, a piston in each of said cylinders, and means whereby said pistons are operated in unison.

7. The combination of a plurality of alined cylinders, a piston in each of said cylinders, a rod to which said pistons are connected and by which they are operated in unison, a passage connecting opposite ends of each of said cylinders, a passage whereby one of said cylinders can discharge into the other, a liquid capable of absorbing a gas in each of said passages, a passage by which gas is drawn into one of said cylinders by the operation of the piston therein, a valve for closing said last named passage, said last named piston being adapted for driving gas in the cylinder last named through the passage connecting the respective ends of said cylinder whereby a constituent of said gas is absorbed, a gage for indicating the pressure of the gas delivered from said last named passage, a gage for indicating the pressure of gas delivered to the second of said cylinders from the first of said cylinders through the connecting passage specified by the operation of the respective pistons, and a gage for indicating the pressure of gas delivered through the passage connecting the ends of said second named cylinder by the action of the piston therein.

8. The combination of a cylinder, a piston therein, means comprising a passage wherethrough gas can be driven from the forward to the rearward end of said cylinder by the operation of said piston, a passage whereby gas can be drawn into said cylinder by the operation of said piston, valve mechanism for controlling the connection of the forward end of said cylinder with said passages alternately, a passage by which gas can be discharged from the rearward end of said cylinder, valve mechanism for controlling the connection of the rearward end of said cylinder with the thereto connected passages alternately, and a pressure gage connected with the rear end of said cylinder.

9. The combination of a cylinder, a piston therein, means comprising a passage wherethrough gas can be driven from the forward to the rearward end of said cylinder by the operation of said piston, a passage whereby gas can be drawn into said cylinder by the operation of said piston, valve mechanism for controlling the connection of the forward end of said cylinder with said passages alternately, a passage by which gas can be discharged from the rearward end of said cylinder, valve mechanism for controlling the connection of the rearward end of said cylinder with the thereto connected passages alternately, means for simultaneously shifting said valves, and a gage connected with the rear end of said cylinder.

10. The combination of a cylinder, a piston therein, means comprising a passage wherethrough gas can be driven from the forward to the rearward end of said cylinder by the operation of said piston, a passage whereby gas can be drawn into said cylinder by the operation of said piston, valve mechanism for controlling the connection of the forward end of said cylinder with the respective passages, a passage by which gas can be discharged from the rearward end of said cylinder, valve mechanism for controlling the connection of the rearward end of said cylinder with the passages connected therewith, means for operating said valve mechanisms in unison, and a gage connected with the rearward end of said cylinder.

11. The combination of a cylinder, a piston therein, means comprising a passage wherethrough gas can be driven from the forward to the rearward end of said cylinder by the operation of said piston, a passage whereby gas can be drawn into said cylinder by the operation of said piston, valve mechanism for controlling the connections of the forward end of said cylinder with the respective passages, a passage by which gas can be discharged from the rearward end of said cylinder, a gage, a passage connecting said gage with the rearward end of said cylinder, valve mechanism for controlling the connection of the rearward end of said cylinder with the thereto connected passages, and a motor for operating said piston and valve mechanisms in unison.

12. The combination of a cylinder, a piston therein, means comprising a passage wherethrough gas can be driven from the forward to the rearward end of said cylinder by the operation of said piston, a passage whereby gas can be drawn into said cylinder by the operation of said piston, valve mechanism for controlling the connections of the forward end of said cylinder with the respective passages, and a recording mechanism operating under control of the pressure of the gas expanded in the rearward end of said cylinder.

13. The combination of a container for a substance capable of absorbing a constituent of a gas, with a piston and cylinder whereby a definite volume of gas is passed from one end of said cylinder into said container and gas not absorbed by said substance is expanded in the other end of said cylinder to said definite volume, a motor for operating said piston, and means operated by the pressure of said expanded gas for indicating the amount of said constituent.

14. In a gas analyzer, means comprising a container for a substance capable of absorbing one constituent of a gas, mechanism for measuring a definite volume of said gas, mechanism for forcing said volume of gas through said means and for expanding the gas deprived of said constituent to the original volume, and a gage operated by the pressure of said expanded gas; in combination with further means comprising a container for a substance capable of absorbing a second constituent, mechanism for forcing said volume of expanded gas through said further means and for expanding the remaining gas again to said original volume and another gage operated by the pressure of said last mentioned expanded gas.

In witness whereof I have hereunto set my name this 10 day of May, 1911, in the presence of the subscribing witnesses.

HEARLEY HOWELL WILSON.

Witnesses:
 LEWIS MARCHANT,
 THOS. F. O'NEILL.